(12) United States Patent
Su et al.

(10) Patent No.: US 10,091,006 B2
(45) Date of Patent: Oct. 2, 2018

(54) CERTIFICATE PINNING USING A DIRECTORY SERVICE

(71) Applicant: Citrix Systems, Inc., Fort Lauderdale, FL (US)

(72) Inventors: Jiawen Su, Sunnyvale, CA (US); Janardhanan Jawahar, San Jose, CA (US); Prashant Batra, San Jose, CA (US); Shaunak Mistry, Scotts Valley, CA (US); Abbas Mahyari, Castro Valley, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 326 days.

(21) Appl. No.: 15/019,118

(22) Filed: Feb. 9, 2016

(65) Prior Publication Data

US 2017/0230355 A1 Aug. 10, 2017

(51) Int. Cl.
*H04L 9/32* (2006.01)
*H04L 29/06* (2006.01)

(52) U.S. Cl.
CPC ........ *H04L 9/3268* (2013.01); *H04L 63/0435* (2013.01); *H04L 63/0823* (2013.01); *H04L 63/0853* (2013.01); *H04L 63/1466* (2013.01)

(58) Field of Classification Search
CPC ..... H04L 9/0825; H04L 9/321; H04L 9/3268; H04L 63/0428; H04L 63/0442–63/045; H04L 63/062–63/064; H04L 63/0823; H04L 63/0853; H04L 63/1466
See application file for complete search history.

(56) References Cited

U.S. PATENT DOCUMENTS

| | | | |
|---|---|---|---|
| 6,874,084 B1 * | 3/2005 | Dobner | H04L 63/0281 709/223 |
| 8,677,466 B1 | 3/2014 | Chuang et al. | |
| 2009/0037997 A1 | 2/2009 | Agbabian et al. | |
| 2014/0283054 A1 | 9/2014 | Janjua et al. | |
| 2017/0195299 A1 * | 7/2017 | James | H04L 63/0442 |

OTHER PUBLICATIONS

Dierks et al. RFC [5246]: "The Transport Layer Security (TLS) Protocol, Version 1.2", Network Working Group, Standards Track, Published: Aug. 2008. (Year: 2008).*

(Continued)

*Primary Examiner* — Kevin Bechtel
(74) *Attorney, Agent, or Firm* — BainwoodHuang (57) ABSTRACT

A user device obtains a set of one or more public key certificates for a server received from a directory service, and a current public key certificate of the server received from the server. The user device compares the current public key certificate received from the server with the set of public key certificates received from the directory service. If the current public key certificate of the server matches one of the public key certificates in the set of public key certificates for the server, the authenticity of the server is confirmed, and communications are permitted between the user device and the server. Communications between the user device and the server may be prevented unless the current public key certificate from the server matches a public key certificate in the set of public key certificates received from the directory service.

21 Claims, 3 Drawing Sheets

(56) References Cited

OTHER PUBLICATIONS

Cooper et al., "Internet X.509 Public Key Infrastructure Certificate and Certificate Revocation List (CRL) Profile", Network Working Group, Standards Track, RFC 5280, May 2008, The IETF Trust (2008), 135 pages.
Dierks et al.,"The TLS Protocol, Version 1.0", Network Working Group, Standards Track, RFC 2246, Jan. 1999, The Internet Society (1999), 72 pages.
Dierks et al., "The Transport Layer Security (TLS) Protocol, Version 1.2", Network Working Group, Standards Track, RFC 5246, Aug. 2008, The IETF Trust (2008) 104 pages.
Evans et al., "Public Key Pinning Extension for HTTP", Internet Engineering Task Force (IETF), Google, Inc., RFC 7469, ISSN: 2070-1721, Standards Track, Apr. 2015, 28 pages.
Turner et al., "Prohibiting Secure Sockets Layer (SSL) Version 2.0", NIST, RFC 6176, Internet Engineering Task Force, ISSN: 2070-1721, Standards Track, Mar. 2011, 4 pages.
Mistry, Shaunak, "Certificate Pinning in Highly Secure Network Environments Using Public Key Certificates Obtained From a DHCP (Dynamic Host Configuration Protocol) Server," U.S. Appl. No. 15/628,107, filed Jun. 20, 2017.
"Domain Name System", Wikipedia, Internet Engineering Task Force (Internet standards), Jan. 7, 2016, pp. 1-18, <<https://en.wikipedia.org/wiki/Domain_Name_System>> Article was retrieved on Mar. 16, 2017.

\* cited by examiner

CERTIFICATE PINNING USING A DIRECTORY SERVICE

BACKGROUND

As it is generally known in the areas of cryptography and computer security, a man-in-the-middle attack is an attack in which an attacker secretly relays and possibly alters communications between two parties who believe they are communicating directly with each other. One example of a man-in-the-middle attack is active eavesdropping, in which the attacking entity makes independent connections with the communicating parties, and relays messages between the parties to make them believe they are communicating directly with each other over a private connection, while in fact the entire communication session is being controlled by the attacker. To accomplish this, an attacker must be able to intercept all relevant messages passing between the two parties, and to also inject new messages. Such message interception and injection is straightforward under many circumstances. For example, an attacker within reception range of an unencrypted Wi-Fi wireless access point can potentially insert themselves as a man-in-the-middle.

Existing cryptographic protocols include some form of endpoint authentication specifically intended to prevent man-in-the-middle attacks. For example, the TLS (Transport Layer Security) protocol and its predecessor the SSL (Secure Sockets Layer) protocol include authentication of one or both communicating parties within a public key infrastructure (PKI), using a mutually trusted certificate authority (CA). In addition, some existing environments have provided certificate pinning, in which a client attempts to avoid man-in-the-middle attacks by comparing a certificate previously obtained from a server to a certificate subsequently obtained from the same server, and then allowing communication with the server only when there is a match between the two certificates.

SUMMARY

Unfortunately, previous technologies for preventing man-in-the-middle attacks have had significant shortcomings. Previous user devices have relied on a root certificate of a certificate authority to validate certificates received from servers. Such root certificates of certificate authorities may be built-in to the user device, e.g. included in an application client at development time. However, some existing user devices can be made to load and trust a fraudulent root certificate provided by an attacker, thus allowing a man-in-the-middle attack to be launched between the user device and a server, based on a fraudulent server certificate received from a man-in-the-middle entity, since the fraudulent server certificate will be validated at the user device based on the fraudulent root certificate. For example, a fraudulent root certificate may be inadvertently loaded onto a user device when the user of the device clicks on a link contained in a "phishing" email, and then click "OK" when prompted as to whether the fraudulent root certificate should be loaded. In another example, in a smartphone or the like that supports a "secure digital" (SD) memory card that is removably inserted into the device, an attacker having physical access to the device can install a phony root certificate using the removable memory card.

In addition, previous systems have required all user devices participating in secure communications with a server to re-enroll with the server when the server issues a new certificate, in order to obtain the new certificate. Such operation when the server issues a new certificate may cause service interruptions across potentially large numbers of user devices, resulting in lost productivity and significant user inconvenience.

To address these and other shortcomings of previous technologies, a new technical solution is disclosed that provides secure communications between a user device and a server by performing a certificate pinning operation that includes the user device requesting, from a directory service that is separate and independent from the server, a set of public key certificates for the server that are stored by the directory service. The disclosed pinning operation further includes receiving, by the user device from the directory service, the set of public key certificates for the server, and storing the set of public key certificates for the server within the user device. The user device also performs a server certificate request operation by requesting, from the server, a current public key certificate of the server, receiving the current public key certificate of the server from the server, and storing the current public key certificate of the server within the user device. The user device then compares the current public key certificate of the server that it received from the server with each certificate in the set of public key certificates for the server that it received from the directory service. In response to the current public key certificate of the server received from the server matching one of the public key certificates in the set of public key certificates for the server received from the directory service, the authenticity of the server is confirmed, and communications are permitted between the user device and the server. The user device may prevent subsequent communications between the user device and the server unless the current public key certificate received from the server matches one of the public key certificates in the set of public key certificates for the server received from the directory service.

In another aspect of the disclosed technology, the user device may initially perform the certificate pinning operation prior to communicating with the server (e.g. prior to establishing a secure connection with the server), in order to obtain an initial set of public key certificates for the server from the directory service. The user device may further initially perform the server certificate request in response to completion of the initial certificate pinning operation, in order to obtain a first current public key certificate of the server from the server prior to any other communications with the server (e.g. prior to establishing a secure connection with the server). The user device may then prevent subsequent communications between the user device and the server unless the first current public key certificate received from the server matches one of the public key certificates in the initial set of public key certificates for the server received from the directory service, for example by preventing the establishment of a secure connection between the user device and the server.

The user device may include user agent software that is used to access the directory service and the server. The user agent software may include an embedded (i.e. hard-coded) public key certificate of the directory service. The user agent software may use the embedded public key certificate of the directory service to ensure secure communication between the user device and the directory service. For example, the user agent software may compare the embedded public key certificate of the directory service to a public key certificate of the directory service presented by the directory service, in order to detect a man-in-the-middle attack between the user device and the directory service. If the user agent detects a mismatch between the public key certificate of the directory service that is embedded in the user agent and the public key certificate of the directory service presented by the directory service, a man-in-the-middle attack may be underway, and the user agent will stop performing certificate pinning operations using the directory service.

In another aspect of the disclosed technology, the user device may periodically perform the certificate pinning operation in order to periodically obtain an updated set of public key certificates for the server, and also periodically perform the server certificate request operation in order to periodically obtain an updated current public key certificate of the server. The user device may then prevent subsequent communications between the user device and the server unless the updated current public key certificate received from the server matches one of the public key certificates in the updated set of public key certificates for the server received from the directory service, for example by tearing down a previously established secure connection between the user device and the server.

The disclosed directory service may store multiple public key certificates in association with a domain name corresponding to a server, and the certificate pinning operation may include transmitting a request message including the domain name corresponding to the server from the user device to the directory service. The set of public key certificates for the server received from the directory service may accordingly include the multiple public key certificates stored by the directory service in association with the domain name corresponding to the server, and the user device may then prevent subsequent communications between the user device and the server unless the current public key certificate received from the server matches one of the multiple public key certificates in the set of public key certificates for the server received from the directory service.

In another aspect of the disclosed technology, the user device may also request, from the directory service, an internet protocol (IP) address of the server. The directory service may then return an internet protocol (IP) address stored by the directory service in association with the domain name corresponding to the server. The user device may then store the internet protocol (IP) address of the server received from the directory service, and perform the server certificate request operation using the internet protocol (IP) address of the server received from the directory service as a destination internet protocol (IP) address for the request for the current public key certificate of the server that is transmitted to server.

The disclosed system may be embodied to support seamless transitioning between different public key certificates of a server. In this regard, each one of the public key certificates received from the directory service in a set of public key certificates for a given server may include an expiration date. For example, a first public key certificate may include a first expiration date and a second public key certificate may include a second expiration date that is subsequent to the first expiration date. In such a case, prior to the first expiration date, the disclosed technology may prevent subsequent communications between the user device and the server unless a current public key certificate received from the server matches one of either the first public key certificate or the second public key certificate. The user device may then discard the first public key certificate on or after the first expiration date, and from the first expiration date to the second expiration date prevent subsequent communications between the user device and the server unless a current public key certificate received from the server matches the second public key certificate, thus seamlessly transitioning from using the first public key certificate of the server to using the second public key certificate of the server to ensure secure communications between the user device and the server.

The directory service may store multiple public key certificates for each server in a set of multiple servers, and the user device may periodically perform the certificate pinning operation for each one of the multiple servers to periodically obtain an updated set of public key certificates for each one of the multiple servers, and periodically perform the server certificate request operation for each one of the multiple servers to periodically obtain an updated current public key certificate for each one of the multiple servers. The user device may then prevent subsequent communications with individual ones of the multiple servers unless the updated current public key certificate received from a given server matches one of the public key certificates in the updated set of public key certificates for that server received from the directory service.

The disclosed system may be embodied to conveniently enable a new set of certificates for a server to be loaded into the directory service, e.g. in response to user commands received through a user interface provided to an authenticated user, such as a system manager user or the like. The directory service may initially store the new set of certificates for the server together with a previously loaded certificate for the server, and then invalidate the previously loaded certificate in the directory service upon expiration of a predetermined time period following the loading of the new set of certificates for the server. The directory service accordingly may respond to requests from the user device for the set of public key certificates for the server prior to expiration of the predetermined time period following the loading of the new set of certificates for the server by sending the new set of public key certificates for the server together with the previously loaded certificate for the server to the user device, and respond to requests from the user device for the set of public keys for the server subsequent to the expiration of the predetermined time period following the loading of the new set of public key certificates for the server into the directory service by sending the new set of public key certificates for the server without the previously loaded certificate for the server to the user device.

Alternatively, a new set of certificates for the server may be loaded into the directory service together with an indication to immediately invalidate at least one previously loaded certificate for the server at the time of the loading of the new set of certificates. The directory service accordingly responds to requests from the user device for the set of public keys for the server subsequent to loading the new set of public key certificates for the server into the directory service by sending the new set of public key certificates for the server without the previously loaded certificate for the server to the user device.

Embodiments based on the disclosed technologies may solve significant problems inherent in previous technologies. For example, by obtaining a set of public key certificates for a server from a separate and independent directory service and using that set of public key certificates to perform certificate pinning, the disclosed system can effectively detect man-in-the-middle attacks that may have gone undetected by previous systems. Man-in-the-middle attacks may, for example, be detected by the disclosed system even when a fraudulent root certificate has been loaded into the user device, and used to validate the attacker's phony server certificate. In addition, since the directory service may store, and provide to the user device, both a currently valid server certificate and a server certificate with a later expiration date, the user device can seamlessly continue operating on a secure connection with the server even across the issuance of a new server certificate, and/or the expiration of a previous certificate, thus avoiding the lost productivity and user inconvenience concomitant with the expiration or invalidation of old certificates and/or the issuance of new server certificates in previous systems.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments of the invention will now be described. It should be understood that such embodiments are provided only by way of example and to illustrate various features and principles of the invention, and that the invention itself is broader than the specific examples of embodiments disclosed herein.

The individual features of the particular embodiments, examples, and implementations disclosed herein can be combined in any desired manner that makes technological sense. Moreover, such features are hereby combined in this manner to form all possible combinations, permutations and variants except to the extent that such combinations, permutations and/or variants have been explicitly excluded or are impractical. Support for such combinations, permutations and variants is considered to exist in this document.

Figure 1:
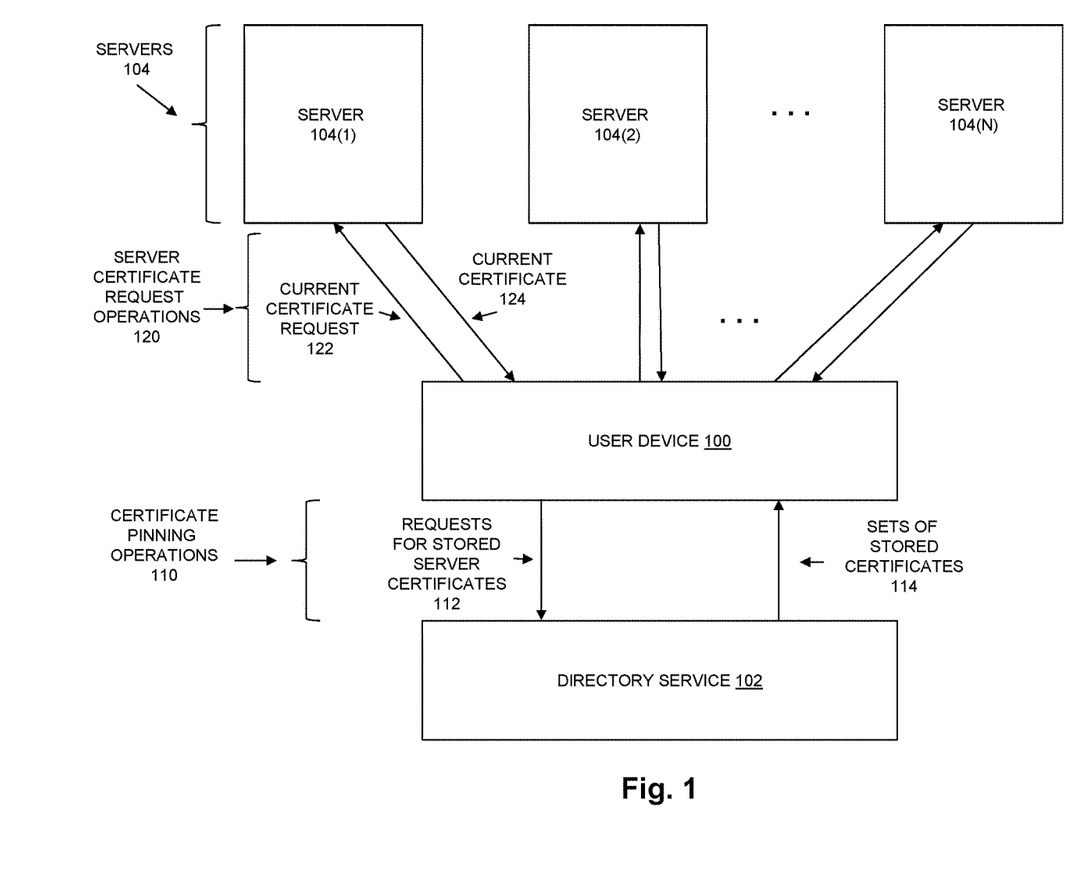
FIG. 1 is a block diagram showing an example of components in an illustrative embodiment of the disclosed system.

FIG. 1 is a block diagram showing an example of components in an illustrative embodiment of the disclosed technology for providing secure communications between a User Device 100 and at least one server (e.g. between User Device 100 and one or more of Servers 104). User Device 100 may consist of or include any specific type of computer or computer system, including but not limited to a desktop computer, laptop computer, or tablet computer, or a computerized handheld device such as a smartphone or personal digital assistant. User Device 100 may further include and execute various specific types of software, including but not limited to user agent software that acts on behalf of a user of User Device 100, and that acts as a client entity when communicating with each of the Servers 104. Such user agent software may, for example, be embodied as a Web browser program or other specific type of client software. In the illustrative example of FIG. 1, Servers 104 are shown including Server 104(1) through Server 104(N). Each of the Servers 104 may be embodied to include or consist of one or more physical server computer systems, or alternatively as one or more virtual private servers (VPSs), such as a cloud server or the like. Each one of Servers 104 may further be embodied to include or consist of application server software which may include or run one or more Web applications and/or Web servers that provide server functionality for a client-server distributed application provided by that server. Any specific type of resource, application or service may be provided by any individual one of the Servers 104, such as, for example, a Web site, electronic mail, online retail sales, online auctions, instant messaging services, and/or any other specific type of application.

Directory Service 102 is separate and independent from any of the Servers 104. For example, Directory Service 102 may include or consist of one or more server systems (e.g. one or more physical server computer systems, virtual private servers (VPSs), cloud servers, etc.) that are physically separate and/or operate independently from any of the servers in Servers 104. Accordingly, Directory Service 102 may include or consist of one or more server systems that have physical locations that are remote from the physical locations of any of the servers in Servers 104. Similarly, Directory Service 102 may include or consist of software executing on one or more server computer systems that are separate and independent from the computer system(s) on which any of the Servers 104 executes. Additionally, Directory Service 102 may consist of or include one or more network addressable computers and/or software entities that are identified by and accessed using one or more network addresses (e.g. internet protocol (IP) addresses) that are different from any network addresses (e.g. internet protocol (IP) addresses) that identify and/or are used to access any of the servers in Servers 104. Directory Service 102 stores a set of one or more public key certificates for each one of the Servers 104. Each public key certificate in the set of public key certificates for a given server is an electronic document that contains a public key of a public/private key-pair assigned to that server, as well as a domain name corresponding to the server. The public key of a public key certificate for a given server, and/or other information contained in the certificate, may be used by the User Device 100 to establish secure communications with that server, for example using the Transport Layer Security (TLS) protocol or its predecessor the Secure Sockets Layer (SSL) protocol to establish a secure connection between the User Device 100 and the server. In one embodiment, each public key certificate, including each public key certificate stored within and/or obtained from the Directory Service 102, stored within and/or obtained from one of Servers 104, and/or stored within and/or obtained by User Device 100, may be a public key certificate conforming to the format specified by the X.509 standard for public key infrastructure (PKI). See for example "Internet X.509 Public Key Infrastructure Certificate and Certificate Revocation List (CRL) Profile", Request for Comments 5280, D. Cooper, S. Santesson, S. Farrell, S. Boeyen, R. Housley, W. Polk, May 2008, all disclosures of which are hereby included by reference herein.

Each public key certificate stored by the Directory Service 102 and provided to User Device 100 may include a digital signature that can be used by the User Device 100 to validate the certificate. For example, each public key certificate stored by Directory Service 102 and provided to User Device 100 may be digitally signed by a certificate authority (CA) that issued the public key certificate. Alternatively, one or more of the public key certificates stored by Directory Service 102 and provided to User Device 100 may not be digitally signed by a certificate authority (CA), and may instead be signed by the Directory Service 102.

During operation of the illustrative embodiment shown in FIG. 1, as part of providing secure communications between User Device 100 and one or more of the Servers 104, the User Device 100 performs one or more certificate pinning operations, as illustrated by Certificate Pinning Operations 110. The Certificate Pinning Operations 110 include User Device 100 sending Requests for Stored Server Certificates 112 from User Device 100 to Directory Service 102. The Certificate Pinning Operations 110 further include User Device 100 receiving Sets of Stored Certificates 114 from Directory Service 102, and storing the received Sets of Stored Certificates 114 within User Device 100.

Each individual one of the Certificate Pinning Operations 110 includes User Device 100 requesting a set of public key certificates for a single one of the Servers 104 from the Directory Service 102 (e.g. by transmitting one of the Requests for Stored Server Certificates 112 to Directory Service 102), receiving the set of public key certificates for that server from the Directory Service 102 (e.g. by receiving one of the Sets of Stored Certificates 114), and storing the received set of public key certificates within the User Device 100 (e.g. by storing the received set of public key certificates within a certificate set store or the like within User Device 100).

During a certificate pinning operation with regard to Server 104(1), User Device 100 transmits a request for the set of public key certificates for Server 104(1) to Directory Service 102. The request may include an indication, such as an address, name, or other identifier, of Server 104(1). For example, each one of the Servers 104 may correspond to a domain name. A domain name corresponding to a given one of the Servers 104 may, for example, identify an online resource, such as a Web site and/or online service, that is provided by that server. Accordingly, a request in Requests for Stored Server Certificates 112 may contain a domain name corresponding to the specific server for which the stored set of public key certificates is being requested. A request for the set of public key certificates for Server 104(1) would therefore indicate Server 104(1) by containing a domain name corresponding to Server 104(1). Directory Service 102 responds to each one of the Requests for Stored Server Certificates 112 by sending a corresponding one of the Sets of Stored Certificates 114 to User Device 100. For example, in response to receiving the request from User Device 100 for the set of public key certificates stored for Server 104(1), Directory Service 102 may use the domain name contained in the request to search a certificate set database maintained by and/or contained in Directory Service 102 in order to retrieve the set of public key certificates for Server 104(1), previously stored by Directory Service 102. The Directory Service 102 then sends the retrieved set of public key certificates for Server 104(1) to User Device 100 (e.g. as one of Sets of Stored Certificates 114). Continuing with the example certificate pinning operation with regard to Server 104(1), User Device 100 then receives the set of public key certificates for Server 104(1), and stores the received set of public key certificates for Server 104(1) within User Device 100. For example, User Device 100 may store the set of public key certificates for Server 104(1) within User Device 100 in a certificate store contained in User Device 100, in association with the domain name corresponding to Server 104(1).

User Device 100 may include and execute user agent software that is used to access the Directory Service 102 and Servers 104. The user agent software may include an embedded (i.e. hard-coded) public key certificate of the Directory Service 102. The user agent software may use the public key from the embedded public key certificate of the directory service to ensure secure communication between the User Device 100 and the Directory Service 102, such that a man-in-the-middle attack cannot be successfully performed between the user device and the directory service. If the user agent ever detects a mismatch between the public key certificate of Directory Service 102 that is embedded in the user agent and a public key certificate of the Directory Service 102 presented by the Directory Service 102, the user agent will cease to trust the Directory Service 102, and will accordingly prevent subsequent certificate pinning operations from being performed by User Device 100 using Directory Service 102.

Whenever the public key of Directory Service 102 changes, the user agent software in the User Device 100 is updated to a new version, where the new version of the user agent software has the new public key certificate of Directory Service 102 embedded therein. In this way trusted communications between one or more user devices and the directory service can be continuously maintained across changes in the public key of Directory Service 102.

User Device 100 may also operate to validate each one of the public key certificates received in the Sets of Stored Certificates 114, based on digital signatures contained in the individual received public key certificates. The validation of individual public key certificates may be performed using a public key certificate of a certificate authority (CA) stored in User Device 100, or using a public key certificate of the Directory Service 102 that is embedded in user agent software executing on User Device 100. For example, a public key certificate obtained by the User Device 100 from Directory Service 102 may be digitally signed by a certificate authority (CA). In that case, a public key certificate of the certificate authority (CA), embedded in the User Device 100 (e.g. hard-coded in user agent software executing in User Device 100), may be used by User Device 100 to validate the received public key certificate based on the digital signature of the certificate authority (CA) contained in the public key certificate. Alternatively, a public key certificate obtained by the User Device 100 from Directory Service 102 may be digitally signed by Directory Service 102. In that case, a public key certificate of the Directory Server 102, embedded in user agent software within the User Device 100 (i.e. hard-coded in user agent software executing in User Device 100), may be used by User Device 100 to validate the received public key certificate based on the digital signature of the Directory Service 102 contained in the public key certificate. The User Device 100 may operate to discard any received public key certificate that cannot be validated based on its digital signature.

The User Device 100 also performs Server Certificate Request Operations 120 with regard to Servers 104, in order to obtain a current public key certificate of each one of the Servers 104. Specifically, User Device 100 may perform a server certificate request operation for each one of the Servers 104 by requesting, from the server, a current public key certificate of the server, receiving the current public key certificate of the server from the server, and storing the current public key certificate of the server within the User Device 100.

For example, User Device 100 may perform Current Certificate Request 122 with regard to Server 104(1) by sending a "Client Hello" message to Server 104(1), as part of the process of establishing a TLS connection with Server 104(1), in response to which Server 104(1) subsequently transmits its current public key certificate to User Device 100, as shown in FIG. 1 by Current Certificate 124. A description of the "Client Hello" message in the TLS protocol may be found in "The Transport Layer Security (TLS) Protocol)", Version 1.2, Request for Comments 5246, T. Dierks and E. Rescorla, August 2008, all disclosures of which are hereby included herein by reference.

The User Device 100 then compares the current public key certificate of the Server 104(1) that it received from the Server 104(1) with each one of the certificates in the set of public key certificates for Server 104(1) that it received from Directory Service 102. For example, the User Device 100 may perform the comparison between the current public key certificate of the Server 104(1) that it received from the Server 104(1) to each one of the certificates from the set of public key certificates for Server 104(1) that it received from the Directory Service 102 by comparing the public key information of the current public key certificate of the Server 104(1) to the public key information of each one of the certificates from the set of public key certificates for Server 104(1) certificates. In the case where the certificates are X.509 certificates, such a comparison may be performed by comparing the output of a hash algorithm applied to the public key information in the current public key certificate of the Server 104(1) with the output of the same hash algorithm applied to the public key information in each certificate from the set of public key certificates for Server 104(1) received from the Directory Service 102. If the hash algorithm outputs match, then there is a match between the certificates. For example, such a comparison may be performed between the current public key certificate of the Server 104(1) and each one of the certificates in the set of certificates for Server 104(1) received from the Directory Service 102 using "PIN Validation" as described in "Public Key Pinning Extension for HTTP", Request for Comments 7469, ISSN: 2070-1721, C. Evans, C. Palmer, R. Sleevi, April 2015, all disclosures of which are hereby included herein by reference.

In response to the current public key certificate of the Server 104(1), as received from Server 104(1), matching one of the public key certificates in the set of public key certificates for Server 104(1) received from the Directory Service 102, the authenticity of the server is confirmed by User Device 100, and communications between User Device 100 and Server 104(1) are permitted. For example, User Device 100 may allow an HTTP (HyperText Transfer Protocol) communications over a TLS channel established between User Device 100 and Server 104(1) in response to the current public key certificate of the Server 104(1) matching one of the public key certificates in the set of public key certificates for Server 104(1) received from the Directory Service 102.

The User Device 100 may prevent subsequent communications between the User Device 100 and the Server 104(1) unless the current public key certificate of Server 104(1), and received from Server 104(1), matches one of the public key certificates in the set of public key certificates for Server 104(1) received from Directory Service 102. For example, in response to the current public key certificate of Server 104(1) matching none of the public key certificates for Server 104(1) received from Directory Service 102, the User Device 100 may prevent any subsequent HTTP communications between User Device 100 and Server 104(1). Preventing subsequent HTTP communications between User Device 100 and Server 104(1) may, for example, further include tearing down or preventing the establishment of a secure connection (e.g. TLS connection) between User Device 100 and Server 104(1).

User Device 100 may initially perform the Certificate Pinning Operations 110 prior to any communications with the Servers 104, in order to detect first use man-in-the-middle attacks. For example, User Device 100 may perform an initial certificate pinning operation with regard to Server 104(1) prior to establishing or using a secure connection (e.g. TLS connection) with Server 104(1), in order to obtain an initial set of public key certificates for Server 104(1) from Directory Service 102. User Device 100 may further initially perform a server certificate request with regard to Server 104(1) in response to completion of the initial certificate pinning operation with regard to Server 104(1), in order to obtain a first current public key certificate of Server 104(1) from Server 104(1) prior to any other communications between User Device 100 and Server 104(1), e.g. prior to establishing and/or communicating over a secure connection (e.g. TLS connection) between User Device 100 and Server 104(1). User Device 100 may then prevent subsequent communications between User Device 100 and Server 104 (1) unless the first current public key certificate received from Server 104(1) matches one of the public key certificates in the initial set of public key certificates for Server 104(1) received from the Directory Service 102, for example by preventing the establishment of, tearing down, or preventing the subsequent use of a secure connection (e.g. TLS connection) between User Device 100 and Server 104(1).

User Device 100 may also periodically perform Certificate Pinning Operations 110 and Server Certificate Request Operations 120 to detect subsequent man-in-the-middle attacks. For example, User Device 100 may periodically perform (e.g. once per some predetermined number of hours, days, etc.) a certificate pinning operation with regard to Server 104(1) in order to periodically obtain an updated set of public key certificates for Server 104(1), and also periodically perform (e.g. once per the same predetermined number of hours, days, etc.) a server certificate request operation with regard to Server 104(1) in order to periodically obtain an updated current public key certificate of the Server 104(1). User Device 100 may then prevent subsequent communications between User Device 100 and Server 104(1) unless the updated current public key certificate received from Server 104(1) matches one of the public key certificates in the updated set of public key certificates for Server 104(1) received from Directory Service 102, for example by tearing down or preventing the subsequent use of a previously established secure connection (e.g. a TLS connection) between User Device 100 and Server 104(1).

Directory Service 102 may store multiple public key certificates in association with each one of the Servers 104. In one embodiment, for each one of the Servers 104, Directory Service 102 stores multiple public key certificates in association with a domain name corresponding to that server. For example, performing a certificate pinning operation with regard to Server 104(1) may include transmitting, from User Device 100 to Directory Service 102, a request message requesting the set of public key certificates for Server 104(1), where the request message indicates Server 104(1) by containing the domain name corresponding to Server 104(1). The set of public key certificates for Server 104(1) transmitted from Directory Service 102 to User Device 100 in response to the request includes the multiple public key certificates stored by Directory Service 102 in association with the domain name corresponding to Server 104(1). Upon receipt of the set of public key certificates for Server 104(1), User Device 100 may then prevent subsequent communications between User Device 100 and Server 104(1) unless the current public key certificate received from Server 104(1) matches one of the multiple public key certificates in the set of public key certificates for Server 104(1) received from Directory Service 102.

In another aspect of the disclosed technology, User Device 100 may also obtain, from Directory Service 102, an internet protocol (IP) address of each one of the Servers 104. User Device 100 may receive an IP address for each one of Servers 104 within the same messages transmitted from Directory Service 102 that contain Sets of Stored Certificates 114. For example, in response to receipt of a request for the set of public key certificates for Server 104(1), Directory Service 114 may transmit a response message to User Device 100 that contains both the set of public key certificates for Server 104(1), and an internet protocol (IP) address that is also stored by Directory Service 102 in association with the domain name corresponding to Server 104(1). User Device 100 may then internally store both the received set of public key certificates for Server 104(1), and the received internet protocol (IP) address of the Server 104(1) that it received from the Directory Service 102, and perform a subsequent server certificate request operation with regard to Server 104(1) using the internet protocol (IP) address of Server 104(1) received from Directory Service 102 as a destination internet protocol (IP) address for the message transmitted to Server 104(1) requesting the current public key certificate of Server 104(1).

The disclosed system may also be embodied to support seamless transitioning at a user device between different public key certificates of a given server. For example, each of the public key certificates in the set of public key certificates for Server 104(1) received by User Device 100 from Directory Service 102 may include an expiration date. Specifically, the set may consist of a first public key certificate in the set may have a first expiration date, and a second public key certificate may have a second expiration date that is subsequent to the first expiration date. In such a case, prior to the first expiration date, User Device 100 may prevent subsequent communications between User Device 100 and Server 104(1) unless the current public key certificate received from the server matches one of either the first public key certificate or the second public key certificate. User Device 100 may then discard the first public key certificate on or after the first expiration date. From the first expiration date to the second expiration date, User Device 100 operates to prevent subsequent communications between User Device 100 and Server 104(1) unless a current public key certificate received from Server 104(1) matches the second public key certificate. In this way User Device 100 seamlessly transitions from using the first public key certificate to using the second public key certificate of Server 104(1) for the purpose of certificate pinning.

Servers 104, User Device 100 and Directory Service 102 may all be communicably interconnected by one or more communication networks and/or computer networks that allow computers to exchange data. Such networks may, for example, include or consist of one or more Local Area Networks (LANs), Wireless Local Area Networks (WLANs), Wide Area Networks (WANs), e.g. the Internet, and/or any other specific type of network. Messages communicated within or in accordance with Certificate Pinning Operations 110 and/or Server Certificate Request Operations 120 may be embodied and exchanged based on one or more communication protocols including, but not limited to, Hypertext Transfer Protocol (HTTP), Transmission Control Protocol (TCP), Internet Protocol (IP), Ethernet, Wi-Fi, and/or any other specific communication protocol that may be appropriate for a particular network or embodiment.

Figure 2:
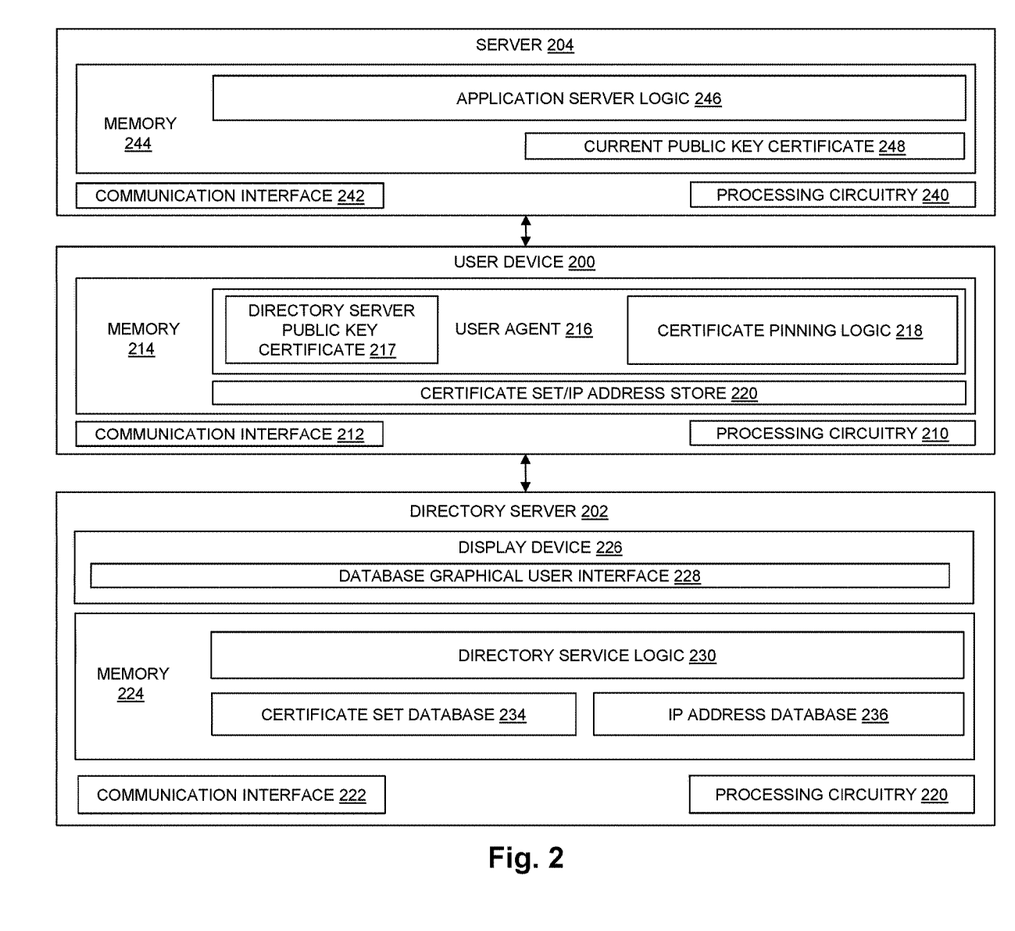
FIG. 2 is a block diagram showing an example of a more detailed view of components in an illustrative embodiment of the disclosed system.

FIG. 2 is a block diagram showing a more detailed view of components in an illustrative embodiment of the disclosed system. FIG. 2 shows a User Device 200, Directory Server 202, and Server 204. User Device 200 is an example of an embodiment of the User Device 100 shown in FIG. 1, Directory Server 202 is an example of an embodiment of the Directory Service 102 shown in FIG. 1, and Server 204 is an example of an embodiment of one of the servers in the Servers 104 shown in FIG. 1, such as Server 104(1). Each of the User Device 200, Directory Server 202 and Server 204 include processing circuitry, one or more communication interfaces, and memory. Specifically, User Device 202 includes Processing Circuitry 210, Communication Interface 212, and Memory 214, Directory Server 202 includes Processing Circuitry 220, Communication Interface 222, and Memory 224, and Server 204 includes Processing Circuitry 240, Communication Interface 242, and Memory 244. Processing Circuitry 210, 212, and 214 may, for example, each include or consist of or include one or more microprocessors or the like. Communication Interfaces 212, 222 and 242 may, for example, each include or consist of one or more network interface cards (NICs) or the like. And Memory 214, Memory 224 and Memory 244 may each include or consist of any specific type of volatile or non-volatile semiconductor memory or the like that is operable to store programs (e.g. sequences of instructions) and/or data (e.g. program state information, input data, output data, etc.) for use in the respective one of User Device 200, Directory Server 202, or Server 204. Directory Server 202 is further shown including a Display Device 226 that may include or consist of any specific type of output device operable to present information in visual form, such as a computer monitor or other type of electronic visual display.

In the illustrative embodiment of FIG. 2, the Memory 214 of User Device 200 stores program code for execution on the Processing Circuitry 210, shown for purposes of illustration by User Agent 216. User Agent 216 is an example of software that acts on behalf of a user of User Device 200, and that acts as a client entity when communicating with Server 204. Such user agent software may, for example, be embodied as a Web browser program or some other specific type of client software. User Agent 216 is further shown including Certificate Pinning Logic 218. During operation of the illustrative embodiment shown in FIG. 2, execution of Certificate Pinning Logic 218 causes User Device 200 to perform, in whole or in part, the various actions described herein as being performed by and/or within a user device, e.g. the actions described above as being performed by or within the User Device 100 shown in FIG. 1, i.e. during operation of the embodiment shown in FIG. 1. Certificate Set/IP Address Store 220 is a data store (e.g. a database or the like) that may be used to store one or more sets of public key certificates for one or more servers, as received from Directory Server 202. Certificate Set/IP Address Store 220 may also be used to store one or more server IP addresses received from Directory Server 202. For example, Certificate Set/IP Address Store 220 may be used to store a set of public key certificates and an IP address for Server 204. The set of public key certificates and the IP address for Server 204 may, for example, be stored in association with a domain name corresponding to Server 204, such as a domain name of a Web resource provided by Server 204.

User Agent 216 is further shown including Directory Server Public Key Certificate 217. Directory Server Public Key Certificate 217 is public key certificate of the Directory Server 202 that is embedded (i.e. hard-coded) in User Agent 216. User Agent 216 uses the public key from Directory Server Public Key Certificate 217 to ensure secure communication between the User Device 200 and Directory Server 202, to prevent a man-in-the-middle attack between User Device 200 and the Directory Server 202. If User Agent 216 detects a mismatch between Directory Server Public Key Certificate 217 and a public key certificate of Directory Server 202 that is presented to User Device 200 by the Directory Server 202, User Agent 216 will cease to trust the Directory Server 202, and will accordingly prevent subsequent certificate pinning operations from being performed by User Device 200 using Directory Server 202. When the public key of Directory Server 202 changes, User Agent 216 is updated to a new version having the new public key certificate of Directory Service 102 embedded therein.

User Agent 216 may further include (e.g. have hard-coded therein) public key certificates of one or more trusted third party certificate authorities (CAs), in addition to the Directory Server Public Key Certificate 217, for use in validating server public key certificates received from Directory Server 202 by User Device 200. Memory 214 may further be used to store a copy of one or more current server public key certificates, as received from respective ones of a set of multiple servers. For example, Memory 214 may be used to store a copy of Current Public Key Certificate 248 as received from Server 204.

Further in the illustrative embodiment of FIG. 2, the Memory 224 of Directory Server 202 stores program code for execution on the Processing Circuitry 220, shown for purposes of illustration by Directory Service Logic 230. Directory Service Logic 230 is an example of software that provides a public directory of server public key certificate sets for access by User Device 200. The Directory Server 202 is further shown including a Certificate Set Database 234 and an IP Address Database 236. The Certificate Set Database 234 may be used by Directory Service Logic 230 to store sets of public key certificates for one or more servers. In one embodiment, Certificate Set Database 234 stores a set of public key certificates for each one of multiple servers, including a set of public key certificates for Server 204. Certificate Set Database 234 may store individual sets of public key certificates in association with individual domain names, such that a set of public key certificates for a given server can be retrieved from Certificate Set Database 234 based on a domain name corresponding to that server. For example, the set of public key certificates for Server 204 stored in Certificate Set Database 234 may be retrieved from Certificate Set Database 234 based on a domain name corresponding to Server 204 (e.g. a domain name identifying an online resource, such as a Web site, hosted or otherwise provided by Server 204).

In an embodiment in which the disclosed directory service is embodied as Directory Server 202, and which uses Certificate Set Database 234 to store multiple public key certificates for each server in a set of multiple servers (e.g. a different set of certificates for each server in Servers 104 in FIG. 1), the disclosed user device may be embodied to periodically perform a certificate pinning operation for each one of the multiple servers in order to periodically obtain an updated set of public key certificates from Directory Server 202 for each one of the multiple servers. In such an embodiment, the user device may periodically perform a server certificate request operation for each one of the multiple servers in order to periodically obtain an updated current public key certificate for each one of the multiple servers. The user device may then prevent subsequent communications with each one of the multiple servers unless the updated current public key certificate received from that server matches one of the public key certificates in the updated set of public key certificates for that server received from the directory service.

The IP Address Database 236 may be used by Directory Service Logic 230 to store IP addresses of one or more servers. In one embodiment, IP Address Database 236 stores an IP address for each server in a set of multiple servers, including for example an IP address of Server 204. IP Address Database 236 may store server IP addresses in association with domain names, such that an IP address for a given server can be retrieved from IP Address Database 236 based on a domain name corresponding to that server. For example, the IP address for Server 204 stored in IP Address Database 236 may be retrieved from IP Address Database 236 based on a domain name corresponding to Server 204 (e.g. a domain name identifying an online resource, such as a Web site, hosted or otherwise provided by Server 204).

Those skilled in the art will recognize that while two separate databases 234 and 236 are shown for purposes of illustration in FIG. 2, the disclosed system is not limited to such an approach. Alternatively, the sets of public key certificates and server IP addresses stored in Directory Server 202 may be stored in a single database.

Directory Service Logic 230 may also be embodied to provide a user interface through which an authorized and authenticated user (e.g. a system manager or the like) can conveniently indicate one or more sets of public key certificates to be loaded into Certificate Set Database 234, including or consisting of Database Graphical User Interface 228. In this way, the disclosed system may be embodied to conveniently allow a new set of certificates for a given server (e.g. Server 204) to be loaded into the directory service, e.g. into Certificate Set Database 234 in response to one or more user commands received by Directory Service Logic 230 through Database Graphical User Interface 228. The user commands used to add a given set of public key certificates into Certificate Set Database 234 may indicate the server for which the set of public key certificates is to be stored using the domain name corresponding to that server. The user commands may allow the user to indicate whether a previously loaded certificate is to be invalidated after a period of has expired following the loading of the new certificate set, or immediately upon loading of the new certificate set. For example, Directory Service Logic 230, in response to a user indication that a previously loaded certificate for Server 204 is to be invalidated after a period of time has expired after a new set of certificates has been loaded for Server 204, the disclosed system may initially store a new set of certificates for Server 204 loaded into Certificate Set Database 234 together with a previously loaded certificate for Server 204, and then invalidate the previously loaded certificate for Server 204 upon expiration of a predetermined time period following the loading of the new set of certificates for Server 204. Directory Service Logic 230 may accordingly respond to requests from User Device 200 for the set of public key certificates for Server 204 received prior to expiration of the predetermined time period following the loading of the new set of certificates for Server 204 by sending the newly loaded set of public key certificates for Server 204 together with the previously loaded certificate for Server 204 to User Device 200, and respond to requests from User Device 200 for the set of public keys for Server 204 subsequent to the expiration of the predetermined time period following the loading of the new set of public key certificates for Server 204 by sending the new set of public key certificates for Server 204 to User Device 200 without the previously loaded certificate for Server 204.

Alternatively, commands may be received by Directory Service Logic 230 through Database Graphical User Interface 228 causing Directory Logic 230 to load a new set of certificates for Server 204 may into Certificate Set Database 234, together with a user indication that Directory Service Logic 230 is to immediately invalidate at least one previously loaded certificate for Server 204 at the time the new set of certificates for Server 204 is loaded. Directory Service Logic 230 may accordingly respond to requests from User Device 200 for the set of public keys for Server 204 subsequent to loading the new set of public key certificates for Server 204 into the Certificate Set Database 234 by sending the newly loaded set of public key certificates for Server 204 to User Device 200 without the previously loaded certificate for Server 204.

During operation of the illustrative embodiment shown in FIG. 2, execution of Directory Service Logic 230 causes Directory Server 202 to perform, in whole or in part, the various actions described herein as being performed by a directory service, e.g. the actions described above as being performed by or within Directory Service 102 shown in FIG. 1, during operation of the embodiment shown in FIG. 1.

Further in the illustrative embodiment of FIG. 2, the Memory 244 of Server 204 stores program code for execution on the Processing Circuitry 240, shown for purposes of illustration by Application Server Logic 246. Application Server Logic 246 is an example of application server software which may include or run one or more Web applications and/or Web servers that provide server functionality for a client-server distributed application provided by that server. Any specific type of resource, application or service may be provided by Application Server Logic 246, such as, for example, a Web site, electronic mail, online retail sales, online auctions, instant messaging services, and/or any other specific type of application. Application Server Logic 246 further provides a current public key certificate of Server 204, shown for purposes of illustration by Current Public Key Certificate 248, to User Device 200, in response to receipt of a request for a current public key certificate of Server 204 from User Device 200. Application Server Logic 246 may include application server software and/or Web server software. During operation of the illustrative embodiment shown in FIG. 2, execution of Application Server Logic 246 causes Server 204 to perform, in whole or in part, the various actions described herein as being performed by a server. e.g. the actions described above as being performed by or within one of the Servers 104 (e.g. within Server 104(1)) shown in FIG. 1, during operation of the embodiment shown in FIG. 1.

Those skilled in the art will recognize that while in the example of FIG. 2 Server 204 and Directory Server 202 are shown for purposes of illustration as physical server computer systems, the disclosed technology is not so limited, and that Server 204 and/or Directory Server 202 may alternatively be embodied as one or more virtual private servers (VPSs), such as cloud servers or the like.

In addition, those skilled in the art will further recognize that while certain examples of program logic are shown in FIG. 2 for purposes of illustration and explanation with regard to each of Server 204, User Device 200, and Directory Server 202, other specific program code or logic may also be present in each of Memory 244, Memory 214 and/or Memory 224. Such additional software may, for example, include operating system, middleware, and/or application program code.

Figure 3:
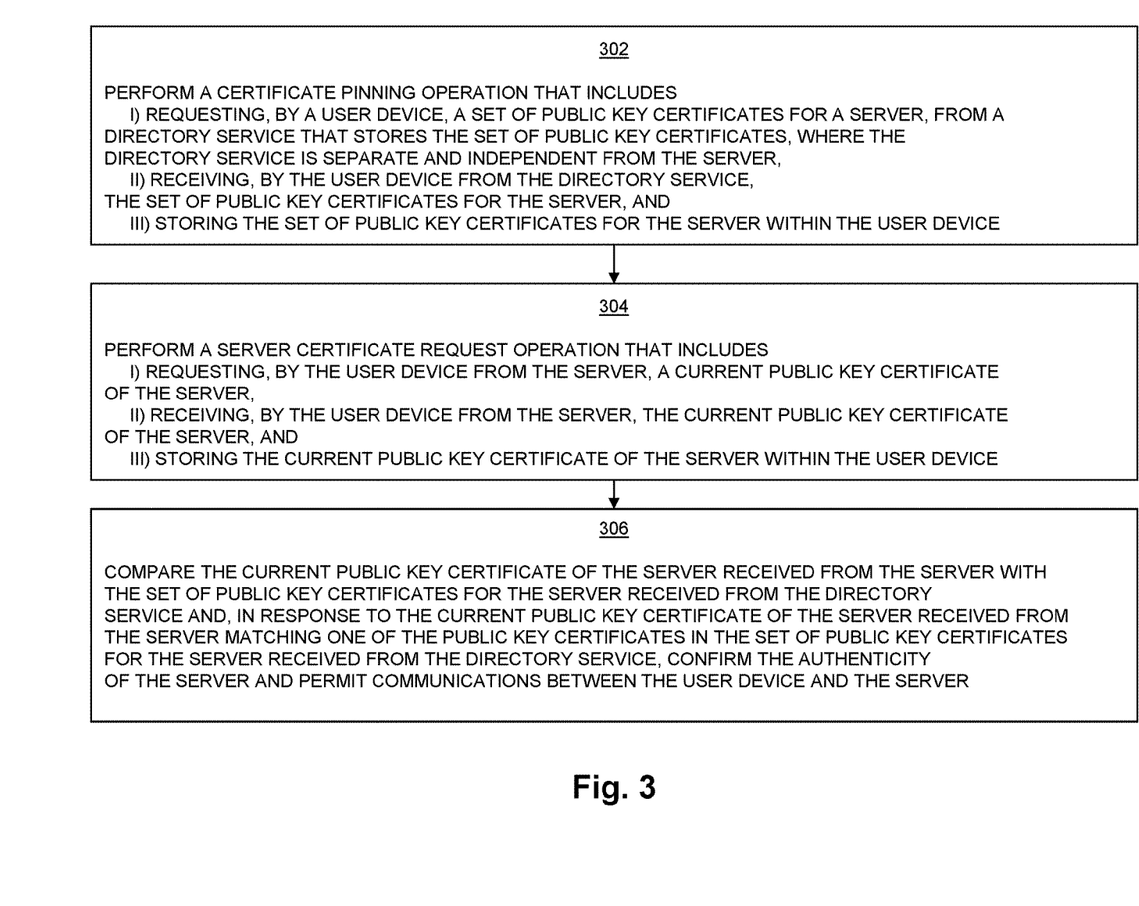
FIG. 3 is a flow chart showing an example of steps performed during operation of an illustrative embodiment.

FIG. 3 is a flow chart showing an example of steps performed during operation of an illustrative embodiment of the disclosed technology. As shown in FIG. 3, at step 302 the disclosed system performs a certificate pinning operation that includes i) requesting, by a user device, a set of public key certificates for a server, from a directory service that stores the set of public key certificates, where the directory service is separate and independent from the server, ii) receiving, by the user device from the directory service, the set of public key certificates for the server, and iii) storing the set of public key certificates for the server within the user device.

At step 304, the disclosed system performs a server certificate request operation that includes i) requesting, by the user device from the server, a current public key certificate of the server, ii) receiving, by the user device from the server, the current public key certificate of the server, and iii) storing the current public key certificate of the server within the user device.

At step 306, the disclosed system compares the current public key certificate of the server received from the server with the set of public key certificates for the server received from the directory service and, in response to the current public key certificate of the server received from the server matching one of the public key certificates in the set of public key certificates for the server received from the directory service, confirm the authenticity of the server and permit communications between the user device and the server. The user device may prevent subsequent communications between the user device and the server unless the current public key certificate received from the server matches one of the public key certificates in the set of public key certificates for the server received from the directory service.

Based on the descriptions herein, those skilled in the art will recognize that embodiments of the disclosed technologies may solve significant problems inherent in previous technologies. For example, by obtaining a set of public key certificates for a server from the disclosed separate and independent directory service, and by using that set of public key certificates to perform certificate pinning, the disclosed technology can effectively detect man-in-the-middle attacks that may have gone undetected by previous systems. For example, man-in-the-middle attacks may be detected by the disclosed system when a fraudulent root certificate has been loaded into the user device, and used to validate the attacker's phony server certificate. The disclosed directory service may further be embodied to store, and to provide to the user device, both a currently valid server certificate and a server certificate with a later expiration date, enabling the user device the user device to seamlessly continue using a secure connection with the server (e.g. a TLS connection) even across the issuance of a new server certificate, and/or the expiration of a previous certificate, thus avoiding the lost productivity and user inconvenience that may otherwise result upon the expiration or invalidation of old certificates and/or the issuance of new server certificates.

While the above description provides examples of embodiments using various specific terms to indicate specific systems, devices, and/or components, such terms are illustrative only, and are used only for purposes of convenience and concise explanation. The disclosed system is not limited to embodiments including or involving systems, devices and/or components identified by the terms used above.

For example, while the description above refers to public key certificates conforming to the format specified by the X.509 standard for public key infrastructure (PKI), the disclosed technologies are not limited that specific type of public key certificate, and may be embodied alternatively using public key certificates based on other formats.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied at least in part in one or more non-transitory computer readable storage medium(s) having computer readable program code stored thereon for causing one or more processors and/or a computer system to carry out those aspects of the present disclosure.

Any combination of one or more non-transitory computer readable storage medium(s) may be utilized. Examples of a non-transitory computer readable storage medium include, but are not limited to, an optical disc (e.g. CD or DVD), an optical storage device, a magnetic disk, a magnetic storage device, a random access memory (RAM), a read-only memory (ROM), an erasable programmable read-only memory (EPROM or Flash memory), and/or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

While the invention is described through the above exemplary embodiments, it will be understood by those of ordinary skill in the art that modification to and variation of the illustrated embodiments may be made without departing from the inventive concepts herein disclosed.

What is claimed is:

1. A computer-implemented method for providing secure communications between a user device and a server, comprising:

performing a certificate pinning operation by i) requesting, by the user device from a directory service that is separate and independent from the server, a set of public key certificates for the server stored by the directory service, ii) receiving, by the user device from the directory service, the set of public key certificates for the server, and iii) storing the set of public key certificates for the server within the user device, wherein the set of public key certificates for the server received from the directory service comprises a set of multiple, individually different public key certificates for the server that are stored by the directory service and that are all sent to the user device by the directory service in response to receipt of the request from the user device by the directory service, and wherein each one of the public key certificates in the set of public key certificates for the server received from the directory service has a different expiration date;

performing a server certificate request operation by i) requesting, by the user device from the server, a current public key certificate of the server, ii) receiving, by the user device from the server, the current public key certificate of the server, and iii) storing the current public key certificate of the server within the user device;

comparing the current public key certificate of the server received from the server with each public key certificate in the set of public key certificates for the server received from the directory service;

in response to the current public key certificate of the server received from the server matching one of the public key certificates in the set of public key certificates for the server received from the directory service, confirming the authenticity of the server and permitting communications between the user device and the server; and preventing subsequent communications between the user device and the server unless the current public key certificate received from the server matches one of the public key certificates in the set of public key certificates for the server received from the directory service.

2. The method of claim 1, further comprising:

initially performing the certificate pinning operation by the user device prior to communicating with the server, to obtain an initial set of public key certificates for the server;

initially performing the server certificate request operation by the user device in response to completion of the initial certificate pinning operation, to obtain a first current public key certificate of the server; and preventing subsequent communications between the user device and the server unless the first current public key certificate received from the server matches one of the public key certificates in the initial set of public key certificates for the server received from the directory service, by preventing establishment of a secure connection between the user device and the server.

3. The method of claim 1, further comprising:

periodically performing the certificate pinning operation to obtain an updated set of public key certificates for the server;

periodically performing the server certificate request operation to obtain an updated current public key certificate of the server; and preventing subsequent communications between the user device and the server unless the updated current public key certificate received from the server matches one of the public key certificates in the updated set of public key certificates for the server received from the directory service, by tearing down a previously established secure connection between the user device and the server.

4. The method of claim 3, wherein the certificate pinning operation further includes iv) requesting, by the user device from the directory service, an internet protocol (IP) address associated with a domain name of the server, v) receiving, by the user device from the directory service, the internet protocol (IP) address associated with the domain name of the server, and vi) storing the internet protocol (IP) address associated with the domain name of the server within the user device; and wherein performing the server certificate request operation uses the internet protocol (IP) address associated with the domain name of the server received from the directory service as a destination internet protocol (IP) address of the request for the current public key certificate of the server.

5. The method of claim 1, wherein the directory service stores multiple public key certificates in association with a domain name of the server;

wherein the certificate pinning operation includes transmitting a request including the domain name of the server from the user device to the directory service; and wherein the set of public key certificates for the server received from the directory service includes the multiple public key certificates stored by the directory service in association with the domain name of the server.

6. The method of claim 5, wherein the set of public key certificates for the server received from the directory service includes a first public key certificate and a second public key certificate, wherein the first public key certificate includes a first expiration date and the second public key certificate includes a second expiration date, the first expiration date being prior to the second expiration date, and further comprising:

prior to the first expiration date, preventing subsequent communications between the user device and the server unless the current public key certificate received from the server matches one of either the first public key certificate or the second public key certificate;

discarding, by the user device, the first public key certificate on the first expiration date; and after the first expiration date and until the second expiration date, preventing subsequent communications between the user device and the server unless the current public key certificate received from the server matches the second public key certificate.

7. The method of claim 1, wherein the directory service stores multiple public key certificates for each server in a set of multiple servers, and further comprising:

periodically performing the certificate pinning operation at the user device for each one of the multiple servers to obtain an updated set of public key certificates for each one of the multiple servers;

periodically performing the server certificate request operation at the user device for each one of the multiple servers to obtain an updated current public key certificate for each one of the multiple servers; and preventing subsequent communications at the user device with each one of the multiple servers unless the updated current public key certificate received from that server matches one of the public key certificates in the updated set of public key certificates for that server received from the directory service.

8. The method of claim 7, wherein the directory service includes a certificate set database operable to store multiple sets of public key certificates for each one of the multiple servers; and wherein the method further comprises providing a database user interface operable to receive both:
  i) an indication of a new set of certificates to be loaded into the certificate set database for one of the multiple servers that corresponds to a domain name provided through the user interface, and
  ii) an indication of whether a set of certificates previously loaded into the certificate set database for the one of the multiple servers is to be either a) invalidated after a predetermined period of time has expired after loading of the new set of certificates into the certificate set database, or b) invalidated immediately after loading of the new set of certificates into the certificate set database.

9. The method of claim 8, further comprising transmitting, by the directory service to the user device, only the new set of certificates for the one of the multiple servers in response to i) receiving a request from the user device containing the domain name corresponding to the one of the multiple servers, and ii) detecting a user indication that the set of certificates previously loaded into the certificate set database for the one of the multiple servers is to be invalidated immediately after loading of the new set of certificates for the one of the multiple servers into the certificate set database.

10. The method of claim 1, further comprising:

loading a new set of certificates for the server into the directory service, wherein the directory service stores the new set of certificates for the server together with a previously loaded certificate for the server;

invalidating the previously loaded certificate in the directory service upon expiration of a predetermined time period following the loading of the new set of certificates for the server;

wherein the directory service responds to requests from the user device for the set of public keys for the server prior to expiration of the predetermined time period following the loading of the new set of certificates for the server by sending the new set of public key certificates for the server with the previously loaded certificate for the server to the user device; and wherein the directory service responds to requests from the user device for the set of public keys for the server subsequent to the expiration of the predetermined time period following the loading of the new set of public key certificates for the server into the directory service by sending the new set of public key certificates for the server without the previously loaded certificate for the server to the user device.

11. The method of claim 1, further comprising:

loading a new set of certificates for the server into the directory service together with an indication to immediately invalidate at least one previously loaded certificate for the server at the time of the loading of the new set of certificates; and wherein the directory service responds to requests from the user device for the set of public keys for the server subsequent to loading the new set of public key certificates for the server into the directory service by sending the new set of public key certificates for the server without the previously loaded certificate for the server to the user device.

12. A user device operable to provide secure communications between the user device and a server, comprising:
   memory; and
   processing circuitry, the memory storing program code that, when executed by the processing circuitry, causes the processing circuitry to:
      perform a certificate pinning operation by i) requesting, by the user device from a directory service that is separate and independent from the server, a set of public key certificates for the server stored by the directory service, ii) receiving, by the user device from the directory service, the set of public key certificates for the server, and iii) storing the set of public key certificates for the server within the user device, wherein the set of public key certificates for the server received from the directory service comprises a set of multiple, individually different public key certificates for the server that are stored by the directory service and that are all sent to the user device by the directory service in response to receipt of the request from the user device by the directory service, and wherein each one of the public key certificates in the set of public key certificates for the server received from the directory service has a different expiration date,
      perform a server certificate request operation by i) requesting, by the user device from the server, a current public key certificate of the server, ii) receiving, by the user device from the server, the current public key certificate of the server, and iii) storing the current public key certificate of the server within the user device,
      compare the current public key certificate of the server received from the server with each public key certificate in the set of public key certificates for the server received from the directory service,
      in response to the current public key certificate of the server received from the server matching one of the public key certificates in the set of public key certificates for the server received from the directory service, confirming the authenticity of the server and permitting communications between the user device and the server, and
      prevent subsequent communications between the user device and the server unless the current public key certificate received from the server matches one of the public key certificates in the set of public key certificates for the server received from the directory service.

13. The user device of claim 12, wherein the program code, when executed by the processing circuitry, further causes the processing circuitry to:
   initially perform the certificate pinning operation prior to communicating with the server, to obtain an initial set of public key certificates for the server;
   initially perform the server certificate request operation in response to completion of the initial certificate pinning operation, to obtain a first current public key certificate of the server; and
   prevent subsequent communications between the user device and the server unless the first current public key certificate received from the server matches one of the public key certificates in the initial set of public key certificates for the server received from the directory service, by preventing establishment of a secure connection between the user device and the server.

14. The user device of claim 12, wherein the program code, when executed by the processing circuitry, further causes the processing circuitry to:
   periodically perform the certificate pinning operation to obtain an updated set of public key certificates for the server;
   periodically perform the server certificate request operation to obtain an updated current public key certificate of the server; and
   prevent subsequent communications between the user device and the server unless the updated current public key certificate received from the server matches one of the public key certificates in the updated set of public key certificates for the server received from the directory service, by tearing down a previously established secure connection between the user device and the server.

15. The user device of claim 14, wherein the program code, when executed by the processing circuitry, further causes the processing circuitry to:
   perform the certificate pinning operation by further iv) requesting, by the user device from the directory service, an internet protocol (IP) address associated with a domain name of the server, v) receiving, by the user device from the directory service, the internet protocol (IP) address associated with the domain name of the server, and vi) storing the internet protocol (IP) address associated with the domain name of the server within the user device; and
   perform the server certificate request operation using the internet protocol (IP) address associated with the domain name of the server received from the directory service as a destination internet protocol (IP) address for the request for the current public key certificate of the server.

16. The user device of claim 12, wherein the directory service stores multiple public key certificates in association with a domain name of the server;
   wherein the certificate pinning operation includes transmitting a request including the domain name of the server from the user device to the directory service; and
   wherein the set of public key certificates for the server received from the directory service includes the multiple public key certificates stored by the directory service in association with the domain name of the server.

17. A computer program product having a non-transitory computer readable medium which stores a set of instructions operable to provide secure communications between a user device and a server, the set of instructions, when executed by processing circuitry, causing the processing circuitry to:
   perform a certificate pinning operation by i) requesting, by the user device from a directory service that is separate and independent from the server, a set of public key certificates for the server stored by the directory service, ii) receiving, by the user device from the directory service, the set of public key certificates for the server, and iii) storing the set of public key certificates for the server within the user device, wherein the set of public key certificates for the server received from the directory service comprises a set of multiple, individually different public key certificates for the server that are stored by the directory service and that are all sent to the user device by the directory service in response to receipt of the request from the user device by the directory service, and wherein each one of the public key certificates in the set of public key certificates for the server received from the directory service has a different expiration date, perform a server certificate request operation by i) requesting, by the user device from the server, a current public key certificate of the server, ii) receiving, by the user device from the server, the current public key certificate of the server, and iii) storing the current public key certificate of the server within the user device, compare the current public key certificate of the server received from the server with each public key certificate in the set of public key certificates for the server received from the directory service, in response to the current public key certificate of the server received from the server matching one of the public key certificates in the set of public key certificates for the server received from the directory service, confirm the authenticity of the server and permitting communications between the user device and the server, and prevent subsequent communications between the user device and the server unless the current public key certificate received from the server matches one of the public key certificates in the set of public key certificates for the server received from the directory service.

18. The computer program product of claim 17, wherein the program code, when executed by processing circuitry, further causes the processing circuitry to:

initially perform the certificate pinning operation prior to communicating with the server, to obtain an initial set of public key certificates for the server;

initially perform the server certificate request operation in response to completion of the initial certificate pinning operation, to obtain a first current public key certificate of the server; and prevent subsequent communications between the user device and the server unless the first current public key certificate received from the server matches one of the public key certificates in the initial set of public key certificates for the server received from the directory service, by preventing establishment of a secure connection between the user device and the server.

19. The computer program product of claim 17, wherein the program code, when executed by processing circuitry, further causes the processing circuitry to:

periodically perform the certificate pinning operation to obtain an updated set of public key certificates for the server;

periodically perform the server certificate request operation to obtain an updated current public key certificate of the server; and prevent subsequent communications between the user device and the server unless the updated current public key certificate received from the server matches one of the public key certificates in the updated set of public key certificates for the server received from the directory service, by tearing down a previously established secure connection between the user device and the server.

20. The computer program product of claim 19, wherein the program code, when executed by processing circuitry, further causes the processing circuitry to:

perform the certificate pinning operation by further iv) requesting, by the user device from the directory service, an internet protocol (IP) address associated with a domain name of the server, v) receiving, by the user device from the directory service, the internet protocol (IP) address associated with the domain name of the server, and vi) storing the internet protocol (IP) address associated with the domain name of the server within the user device; and perform the server certificate request operation using the internet protocol (IP) address associated with the domain name of the server received from the directory service as a destination internet protocol (IP) address for the request for the current public key certificate of the server.

21. The computer program product of claim 17, wherein the certificate pinning operation further includes transmitting a request including the domain name of the server from the user device to the directory service; and wherein the set of public key certificates for the server received from the directory service includes multiple public key certificates stored by the directory service in association with the domain name of the server.

* * * * *